United States Patent
Ge et al.

(10) Patent No.: US 8,121,415 B2
(45) Date of Patent: Feb. 21, 2012

(54) COMBINING FEATURE BOUNDARIES

(75) Inventors: Anthony Wen Ge, Thousand Oaks, CA (US); Robert Lea Jackson, Moorpark, CA (US)

(73) Assignee: Quality Vision International, Inc., Rochester, NY (US)

( * ) Notice: Subject to any disclaimer, the term of this patent is extended or adjusted under 35 U.S.C. 154(b) by 706 days.

(21) Appl. No.: 12/259,845

(22) Filed: Oct. 28, 2008

(65) Prior Publication Data

US 2010/0104216 A1 Apr. 29, 2010

(51) Int. Cl.
*G06K 9/46* (2006.01)
(52) U.S. Cl. ......................................... 382/199; 382/284
(58) Field of Classification Search .................. 382/180, 382/199, 201, 203, 204, 284
See application file for complete search history.

(56) References Cited

U.S. PATENT DOCUMENTS

| | | | | |
|---|---|---|---|---|
| 4,493,105 | A | 1/1985 | Beall et al. | 382/21 |
| 4,897,805 | A * | 1/1990 | Wang | 364/521 |
| 5,371,810 | A | 12/1994 | Vaidyanathan | 382/48 |
| 6,314,349 | B1 * | 11/2001 | Tomasi et al. | 701/23 |
| 7,375,745 | B2 | 5/2008 | Rai et al. | 348/218.1 |
| 2007/0237420 | A1 | 10/2007 | Steedly et al. | 382/284 |

OTHER PUBLICATIONS

International Search Report and Written Opinion of related application No. PCT/us2008/086309 (ISR/WO): dated May 12, 2011; 8 Pages.
Lipton et al.: Moving Target Classification and Tracking from Realtime Video 1998 (7 pages).
Gleason et al.: A Modular Vision System for Sensor-Controlled Manipulation and Inspection (14 pages), undated.
Ibackstrom: Geometry Concepts: Line Intersection and its Applications, Mar. 7, 2008 (5 pages) http://www.topcoder.com/tc?module=Static&d1=tutorials&d2=geometry2.
Szeliski: Image Alignment and Stitching: A Tutorial (105 pages), 2006.
Coordinate Systems (7 pages) dated Oct. 15, 2008 http://xahlee.org/SpecialPlaneCurves_dir/CoordinateSystem_dir/coordinateSystem.html.

(Continued)

*Primary Examiner* — Andrew W Johns
(74) *Attorney, Agent, or Firm* — Stephen B. Salai, Esq.; Thomas B. Ryan, Patent Agent; Harter Secrest & Emery LLP

(57) ABSTRACT

A method of forming a combined feature boundary based on boundaries of first and second overlapping features includes dividing the boundaries of the first and second overlapping features into line segments of known shape, identifying crossing points formed by the line segments, calculating parametric coordinates of the crossing points, and determining a sequence of crossing point evaluation based on the parametric coordinates. The method also includes calculating a first cross product based on the line segments forming a first crossing point in the determined sequence, and choosing a first path of the combined feature boundary according to a mathematical sign of the first cross product, the first path extending from the first crossing point to the second crossing point in the determined sequence. The method further includes calculating a second cross product based on the line segments forming a second crossing point in the sequence, and choosing a second path of the combined feature boundary extending from the second crossing point according to a mathematical sign of the second cross product, wherein the combined feature boundary includes the first and second crossing points and portions of at least one of the first and second feature boundaries defining the first and second paths.

28 Claims, 11 Drawing Sheets

OTHER PUBLICATIONS

Coordinate System (5 pages) dated Oct. 15, 2008 http://en.wikipedia.org/wiki/Coordinate_system.

International Search Report and Written Opinion of related application No. PCT/US2008/086309. (ISR/WO), dated Apr. 30, 2009.

M. Brown and D.G. Lowe, Automatic panoramic image stitching using invariant features, International Journal of Computer Vision, vol. 74, No. 1, pp. 59-73, 2007.

* cited by examiner

| 1 | 2 | 3 | 4 |
|---|---|---|---|
| FEATURE #1 CROSS POINTS IN PARAMETRIC COORDINATES | SORTED INDEX OF FEATURE #1 CROSS POINTS | FEATURE #2 CROSS POINTS IN PARAMETRIC COORDINATES | SORTED INDEX OF FEATURE #2 CROSS POINTS |
| $u$ | $i$ | $v$ | $j$ |
| $u_0$ | $i_0$ | $v_0$ | $j_0$ |
| $u_0$ | $i_1$ | $v_1$ | $j_1$ |
| *** | *** | *** | *** |
| $u_{N-1}$ | $i_{N-1}$ | $v_{N-1}$ | $j_{N-1}$ |

*FIG. 4*

| 1 | 2 | 3 | 4 | 5 |
|---|---|---|---|---|
| FEATURE #1 CROSS POINTS IN PARAMETRIC COORDINATES | SORTED INDEX OF FEATURE #1 CROSS POINTS | FEATURE #2 CROSS POINTS IN PARAMETRIC COORDINATES | SORTED INDEX OF FEATURE #2 CROSS POINTS | COMBINED FEATURE IDENTIFIER |
| u | i | u | j | |
| | $i_0$ | | $j_0$ | 0 |
| | $i_0+1$ | | $j_1$ | 0 |
| | $i_1$ | | $j_1+1$ | 0 |
| | $i_1+1$ | | $j_2$ | 0 |
| | $i_2$ | | $j_2+1$ | 0 |
| | *** | | *** | 0 |
| | $i_3$ | | $j_2-1$ | 0 |
| | $i_4$ | | $j_4$ | 1 |
| | $i_4+1$ | | $j_5$ | 1 |
| | $i_5$ | | $j_5+1$ | 1 |
| | $i_6+1$ | | $j_6$ | 1 |
| | $i_6$ | | $j_6+1$ | 1 |
| | *** | | *** | 1 |
| | $i_7$ | | $j_4-1$ | 1 |
| | *** | | *** | *** |

FIG. 5

COMBINING FEATURE BOUNDARIES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates to equipment and methods used to process images and, in particular, to equipment and methods used to combine features of images obtained from multiple fields of view.

2. Description of Related Art

Automated production lines often employ imaging technology to assist in examining parts or other objects being produced. Imaging technologies commonly utilized on such production lines can include, for example, video imaging, digital photography, and/or other known processes. Typically, known imaging technologies are used to obtain images of such manufactured items within a field of view, and each image may contain a number of geometric contours. Such contours may be, for example, machined surfaces, holes, corners, and/or other tightly-toleranced portions of the fabricated items. These known technologies acquire an image showing the area of interest and may determine, based on the image, whether aspects of the imaged area fall within an acceptable range for the manufactured item. For example, such imaging technologies may be used in high-speed manufacturing lines to examine the parts or other items being produced, and to assist in rejecting parts that are out of tolerance and/or otherwise unacceptable.

In some imaging applications, however, the area of interest may be larger than the field of view of the imaging device. For example, a digital camera or other imaging device used to inspect and/or examine the manufactured items discussed above may have a relatively small field of view, and this field of view may be too small to capture an image of an entire machined surface of the item. In such applications, the area of interest may extend across the boundary of one field of view and into another field of view.

To compensate for the limited field of view associated with known imaging devices, or for the positioning of areas of interest across the boundaries of two adjacent images, imaging devices commonly capture multiple images of the item being examined from multiple fields of view and then combine the corresponding or overlapping portions of the images using digital combination software or other means. The process of combining images from different fields of view is sometimes called "image stitching". However, a great deal of inaccuracy can be introduced when combining images from the different fields of view using known stitching techniques. In addition, such methods commonly require a large amount of computer and/or processor capacity or speed, and can be extremely cumbersome from an operational standpoint.

For example, the images obtained by prior art systems are typically "binary" pixel-based images. Such images are made up of a group of screen pixels that are either on or off. A prior art system may obtain multiple pixel-based images of the region being inspected and, to ensure that the entire region is captured, such systems may overlap the fields of view for each image. For instance, after a first image of the area of interest is taken, such systems may take a second (adjacent) image of the same area wherein the field of view of the second image overlaps the field of view of the first image. Then the first image and the second image are merged or "stitched" together, pixel by pixel.

However, although in the real world each contour of a machined part has a distinct boundary, a first pixel-based image of a contour obtained by prior art systems may have slightly different boundary dimensions or configurations than a second (adjacent) pixel-based image of the same contour. For example, a pixel that is turned "on" in the first contour image may be turned "off" in the second contour image. Such pixel to pixel variations between two adjacent images of the same contour can be caused by a number of factors including, but not limited to, slight camera rotation, imperfect calibration of pixel sizes, and inhomogeneous lighting and shading effects causing some pixels in the binary images to be on in one image and off in the other image. When forming a combined image of the contour, prior art stitching methods typically mask these inaccuracies through alignment and interpolation techniques in which the corresponding pixels in the two images are merged.

Unfortunately, known stitching methods are time-consuming, and create potentially massive images requiring a great deal of computer memory to store and analyze. The inaccuracies inherent in known stitching methods may also have a snowball effect if the resulting combined image is later used in comparison analyses with other images. The pixel to pixel variations and onerous memory requirements of known image combination methods can dramatically reduce the efficiency of a manufacturing line, and may require oversight by one or more human operators. Such deficiencies can be quite costly in many high-speed manufacturing environments.

In a paper entitled "Image Alignment and Stitching", published in *Foundations and Trends in Computer Graphics and Computer Vision,* 2(1), December 2006, Szeliski discusses additional problems associated with prior art methods such as the unreliability of fully automated stitching. Szeliski points out that it is difficult to simultaneously avoid matching spurious features or repeated patterns while also being tolerant of large outliers. Another common problem Szeliski describes is "parallax error", the apparent displacement or difference of orientation of an object viewed along two different lines of sight. The stitching deficiencies discussed in Szeliski greatly limit the accuracy, reliability, and speed of existing combination methods used in automated industrial inspection. Although Szeliski also teaches techniques used to correct image distortions caused by parallax error, such correction techniques are not adequate for most high-precision measurement processes.

U.S. Pat. No. 5,371,810 to Vaidyanathan discloses a method of registering perimeter points with X, Y Cartesian coordinates and with eight-bit direction code values. Vaidyanathan also discloses a sorting method used to determine the linking and connectivity relationship between perimeter points. Vaidyanathan's method of sorting perimeter points fails in complex image merging applications, however, because two-dimentional X, Y coordinates of closed feature perimeters cannot both be monotonic. In addition, the Vaidyanathan method fails to sort all perimeter points uniquely in situations where there are two or more perimeter points having the same X or Y coordinate values. In addition, the precision of Vaidyanathan's method is limited to pixel resolution because the method and final results taught therein are pixel-based.

U.S. Pat. No. 4,493,105 to Beall discloses a method of sorting points similar to that of Vaidyanathan. Beall's approach also fails because two-dimensional X, Y coordinates of closed feature perimeters cannot both be monotonic at the same time. Beall's method is also limited to pixel resolution because the method and its final results are pixel-based. Although Beall does mention feature merging, all of Beall's disclosed methods deal only with simple merging cases. The Beall approach fails in complex merging situations, such as when two features overlap or cross at more than two locations, thereby creating multiple combined feature paths. In addition, neither Vaidyanathan nor Beall teach a method of automatically distinguishing a "simple" feature from a "hole" feature.

Accordingly, the present disclosure is directed towards overcoming problems encountered when one attempts to combine two or more images of a feature that is larger than one field of view. The present disclosure is also directed toward overcoming difficulties associated with combining two or more lists of features.

SUMMARY OF THE INVENTION

In an exemplary embodiment of the present disclosure, a method of forming a combined feature boundary based on boundaries of first and second overlapping features includes dividing the boundaries of the first and second overlapping features into line segments of known shape, identifying crossing points formed by the line segments of the two features, calculating parametric coordinates of the crossing points, and determining a sequence of crossing point evaluation based on the parametric coordinates. The method also includes calculating a first cross product based on the line segments forming a first crossing point in the determined sequence, and choosing a first path of the combined feature boundary according to a mathematical sign of the first cross product, the first path extending from the first crossing point to the second crossing point in the determined sequence. The method further includes calculating a second cross product based on the line segments forming the second crossing point in the sequence, and choosing a second path of the combined feature boundary extending from the second crossing point according to the mathematical sign of the second cross product, wherein the combined feature boundary includes the first and second crossing points and portions of at least one of the first and second feature boundaries defining the first and second paths.

In another exemplary embodiment of the present disclosure, a method of forming a combined feature boundary based on boundaries of first and second overlapping features includes calculating parametric coordinates of a plurality of crossing points, wherein the plurality of crossing points are formed by intersections of the first and second feature boundaries, organizing the plurality of crossing points into a sorted order based on their respective parametric coordinates, determining a mathematical sign of a cross product formed by the intersections at each crossing point, and defining a path of the combined feature boundary between each of the plurality of crossing points based on the mathematical sign. In such an embodiment, the combined feature boundary includes each of the plurality of crossing points arranged according to the sorted order and a portion of at least one of the first and second feature boundaries. The method also includes calculating an area defined by the combined feature boundary; and determining a feature type associated with the combined feature boundary based on a mathematical sign of the calculated area.

In a further exemplary embodiment of the present disclosure, a method of forming a combined feature list includes obtaining first and second lists of features, identifying a plurality of crossing points formed by boundaries of features in the first list overlapping with boundaries of features in the second list, calculating parametric coordinates of each identified crossing point, sorting each of the crossing points according to their respective parametric coordinates, and forming a plurality of combined feature boundaries using the sorted crossing points. The method also includes adding each of the combined feature boundaries to the combined feature list and removing each feature forming the plurality of combined feature boundaries from the first and second lists.

In a further exemplary embodiment of the present disclosure, a method of forming a combined feature boundary based on first and second overlapping feature boundaries includes creating an ordered list of crossing points formed by the overlapping feature boundaries; forming a first portion of the combined feature boundary extending along the first feature boundary in a first direction and terminating at a first crossing point in the ordered crossing point list; selecting the second feature boundary; and forming a second portion of the combined feature boundary connected to the first portion, the second portion extending along the second feature boundary in the first direction and terminating at a second crossing point of the ordered list.

BRIEF DESCRIPTION OF THE DRAWINGS

FIG. 4 illustrates table 1 including a plurality of points corresponding to the first and second features of FIG. 3.

FIG. 5 illustrates table 2 including a plurality of points corresponding to the first and second features of FIG. 3.

DETAILED DESCRIPTION OF THE DRAWINGS

Imaging devices and/or computer aided drawing software may be utilized in various fabrication, assembly, packaging, inspection, monitoring, and/or other manufacturing processes to produce and/or otherwise obtain images of a portion of a manufactured item. Such imaging devices may include, but are not limited to, cameras, scanners, probes, contour sensors, and/or other devices configured to obtain or produce an image of the item based on measurements, calculations, inspection, or sensing methods. For example, in automating the process of detecting whether various portions of a machined part are within desired tolerance limits, a manufacturing line may utilize one or more of the above devices to obtain multiple images of each part produced. These images may depict one or more features of the part being examined in the inspection process. As used throughout the remainder of this disclosure, the term "feature" can be defined as any shape formed on or by at least a portion of an item being examined. Such features may commonly be referred to as "contours" by those having skill in the art, and such features may be formed by, for example, surfaces, corners, radii, diameters, holes, lengths, widths, heights, and/or any other portions of a machined and/or otherwise fabricated item. In addition, images of such features may be projected into a two-dimensional domain. Two-dimensional images of features are commonly referred to as "blobs" by those having skill in the art. The exemplary methods described herein may be used to determine combined feature boundaries and/or form combined feature lists.

For example, an inspection device may employ a digital camera to obtain multiple images of a portion of an item, such as a cam shaft, to determine whether machined portions of the shaft are within desired tolerance levels. In such an exemplary embodiment, however, the digital camera may not be capable of obtaining a single image of the shaft showing all of the machined features disposed thereon. Alternatively, an image obtained by the camera may only display a portion of a machined feature having a critical tolerance determining acceptability of the entire shaft. As a result, the camera may be controlled to obtain multiple images of the shaft in different fields of view. In an exemplary embodiment, these images may be obtained in adjacent fields of view and the fields of view in at least two of the adjacent images may overlap. The corresponding features shown in the multiple images may be combined using the methods described herein.

Figure 1:
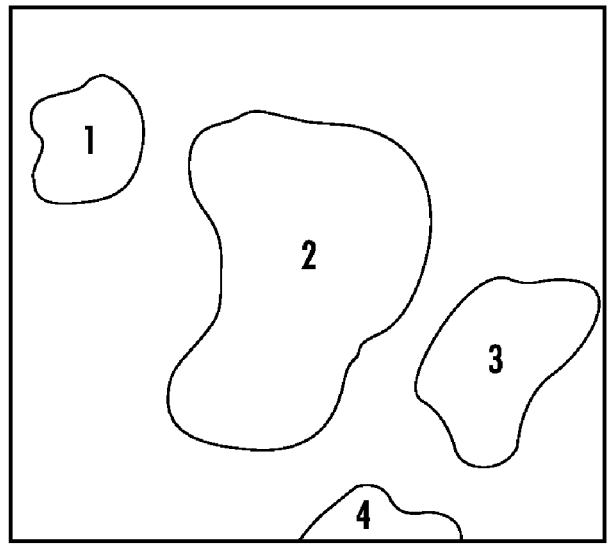
FIG. 1 illustrates a first field of view according to an exemplary embodiment of the present disclosure.
Figure 2:
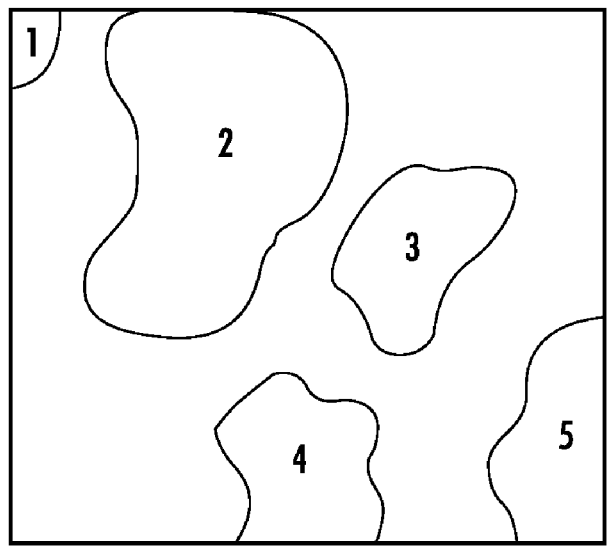
FIG. 2 illustrates a second field of view according to an exemplary embodiment of the present disclosure.

FIGS. 1 and 2 are illustrative of exemplary camera images taken at different or adjacent fields of view. For example, the image illustrated in FIG. 1 may represent a portion of a machined part taken in a first field of view and the image illustrated in FIG. 2 may represent a portion of the same machined part taken in a slightly different or adjacent field of view. As shown in FIGS. 1 and 2, the different fields of view may include different portions of one or more simple features (numbered as Features 1-5), and one field of view may show all or a portion of a feature that is wholly or partially shown in an adjacent field of view. As used herein, the term "simple feature" may be defined as a feature whose image represents an outer boundary of the portion of the item being analyzed. Simple features may be referred to as "features" throughout this disclosure and, as will be discussed below, simple features may be identified as features (combined features or otherwise) whose area is mathematically negative in sign.

Figure 10:
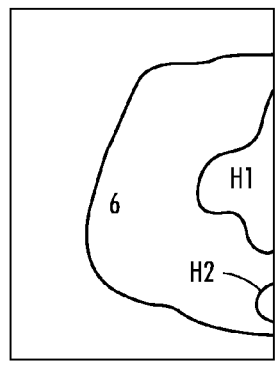
FIG. 10 illustrates a first field of view according to another exemplary embodiment of the present disclosure.
Figure 11:
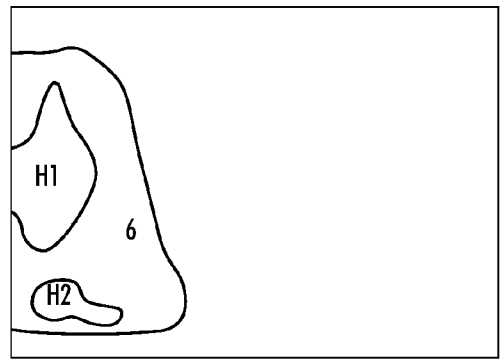
FIG. 11 illustrates a second field of view according to the exemplary embodiment of FIG. 10.
Figure 12:
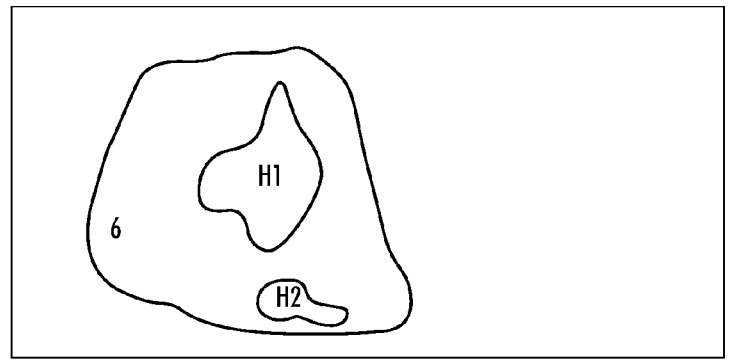
FIG. 12 illustrates a combined feature according to the exemplary embodiment of FIG. 10.

FIGS. 10 and 11 also illustrate exemplary camera images taken in adjacent fields of view. A first portion of a feature of interest (Feature 6) is illustrated in FIG. 10, and a second portion of the same feature is illustrated in the adjacent image shown in FIG. 11. Feature 6 includes first and second hole features H1, H2, and only a portion of hole feature H1 is shown in each of FIGS. 10 and 11. In addition, the boundary of Feature 6 and the boundary of hole H1 extend across FIGS. 10 and 11. As used herein, the term "hole feature" may be defined as a feature whose image is disposed fully within the outer boundary of the portion of the item being analyzed. In exemplary embodiments of the present disclosure, a hole feature may be disposed within a simple feature. Hole features may be referred to as "holes" throughout this disclosure and, as will be discussed below, hole features may be identified as features (combined features or otherwise) whose area is mathematically positive in sign. As illustrated in FIG. 12, the adjacent images of Feature 6, and of the holes H1, H2 defined thereby, can be combined using the methods described herein. The resulting combined Feature 6 of FIG. 12 includes the entire area of the partial feature images illustrated in FIGS. 10 and 11. The exemplary methods of the present disclosure also accurately resolve all feature boundary and/or hole boundary discrepancies when forming the combined feature, and avoid the deficiencies of known pixel stitching or other feature combination methods.

For example, the algorithms and/or other control software of the present disclosure may automatically identify feature images that overlap. The software may combine and/or otherwise merge the overlapping images to form a combined feature boundary, and may also form and/or display an image of the combined feature. In this process, parametric coordinates may be used in defining each feature, and any holes defined thereby, as discrete groupings of linked line segments having distinct endpoints. As described herein, a "parametric coordinate" is a single parameter that uniquely describes a location on a known curve, path, or surface in a two-dimensional or three-dimensional space. A distinct location along the curve corresponds to a unique parametric coordinate. Moreover, the parametric coordinates described herein are monotonic functions and may be, for example, index-based, linear, nonlinear, logarithmic, exponential, inverse, distance-based, or proportional functions, as long as these functions are monotonically increasing or monotonically decreasing along the feature boundary. The use of a single parameter to identify a location on a curve, such as a feature boundary, instead of two-dimensional pixel-based Cartesian coordinates eliminates the ambiguity problems associated with sorting and linking such two-dimensional coordinates. Thus, the use of parametric coordinates in the combination methods disclosed herein greatly simplifies the sorting process, and greatly improves robustness and reliability as compared to prior art methods.

For example, pixel-based combination methods require far more computer capacity and are not capable of as accurately identifying feature crossing points, such as those located between pixel boundaries in two overlapping feature images. These deficiencies are partly due to the limitations inherent in pixel-based images. In particular, pixel-based images are only capable of representing a feature with finite resolution (e.g., the native pixel resolution of the imaging device) using coordinates applicable only to the particular field of view in which the image was obtained. The coordinates applicable to a feature shown in a first field of view are not necessarily aligned with the same feature shown in a second adjacent field of view on a pixel-by-pixel basis. The required time consuming and complex alignment between the image from the first field of view and the image from the second field of view, plus the inhomogeneous lighting and parallax errors mentioned by Szeliski, prevent two images of a feature from being accurately combined using prior art methods. In fact, the dimensional uncertainty suffered during the combination of images using pixel-based methods may be similar to, or even greater than, the machining error, making reliable quality control difficult.

In an exemplary embodiment, the imaging system of the present disclosure may overcome the deficiencies of the prior art by obtaining pixel-based images of the features undergoing examination in partially overlapping adjacent fields of view. The imaging system may then calculate and/or otherwise define the perimeter of each feature using a plurality of discrete line segments of known shape. In an exemplary embodiment, the line segments may be straight line segments. Alternatively, the line segments may be any other shape known in the art such as, but not limited to, curves, arcs, or splines. The system may initially extract the end points of each line segment in Cartesian coordinates and may then define the end points using a single parameter, such as a parametric coordinate. The system may sort the end points in the order in which they appear on each respective feature boundary (in either a clockwise or counterclockwise direction) and may use the Cartesian coordinates of the end points to calculate any crossing points of the line segments. The system may also calculate and/or convert each of the crossing points to parametric coordinates. Identifying the crossing points with parametric coordinates enables the system to define each of the crossing points accurately and uniquely, and to avoid the ambiguity problems encumbering pixel-based methods.

Once the parametric coordinates of each crossing point are determined, the crossing points can be registered and sorted according to their parametric coordinates, and the system can then determine the path from any crossing point on the combined feature boundary by determining the sign of the cross product of the two crossing line segments (vectors) at every crossing point. This calculation may involve, for example, the right hand rule of vector geometry. Using the sorted crossing points and the determined combined feature path, the system can form the combined feature. The system may also convert the parametric coordinates of each segment end point to unit-based real world Cartesian coordinates (such as millimeter-based X, Y Cartesian coordinates). From these unit-based coordinates, the software can determine whether the combined feature and, thus, the item being analyzed is within a desired tolerance range necessary for acceptance of the item. The system can also determine whether the combined feature is a simple feature or a hole feature. Such a determination may be made based on the mathematical sign of the area of the combined feature in question. The system may also perform a distortion correction process after the formation of each combined feature boundary and may form one or more combined feature lists. Aspects of the disclosed method will be described below while a more detailed discussion of an exemplary embodiment of the present disclosure is set forth in the Industrial Applicability section with reference to FIGS. 9 and 9*a*.

Figure 3:
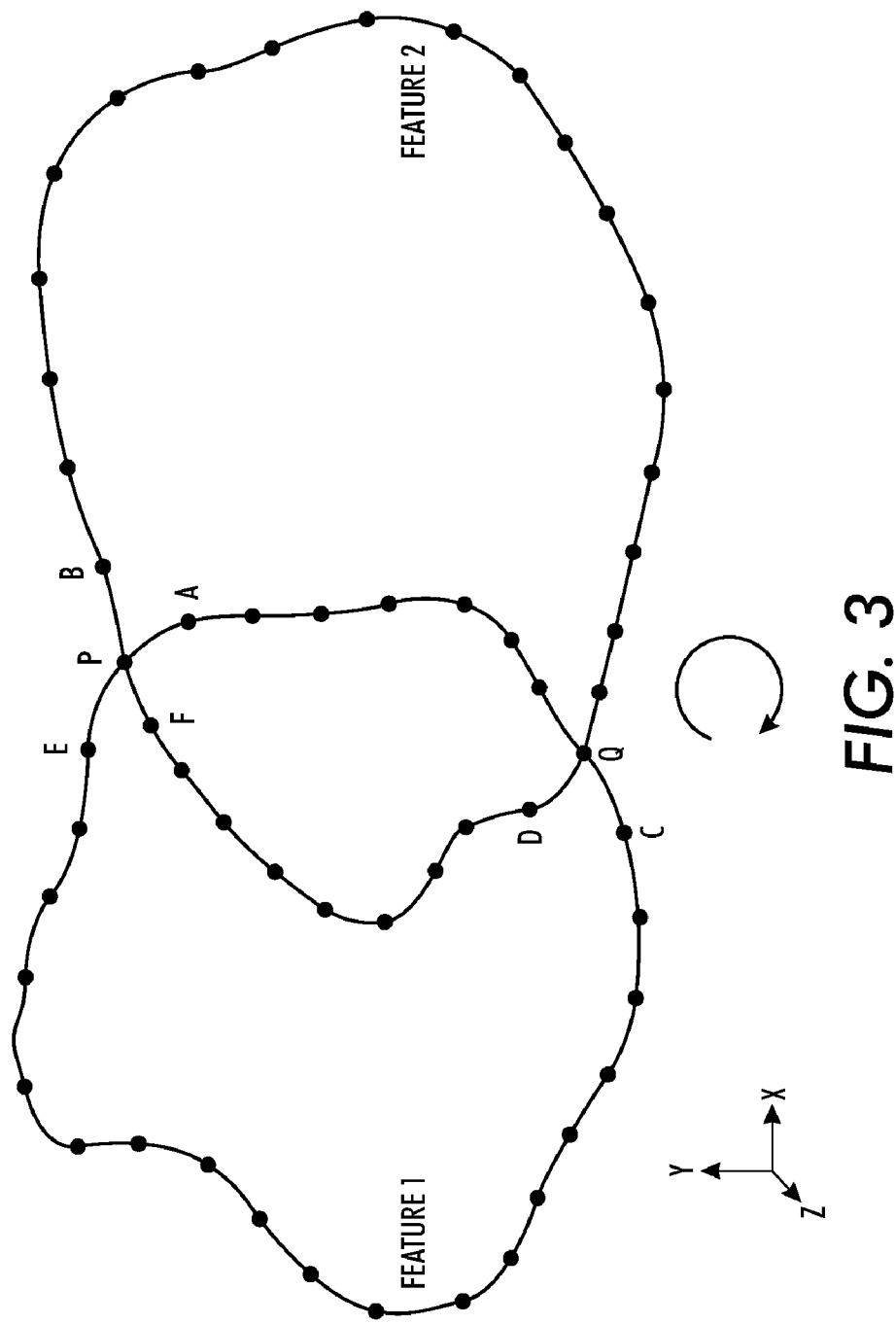
FIG. 3 illustrates a first feature overlapping a second feature according to an exemplary embodiment of the present disclosure.
Figure 6:
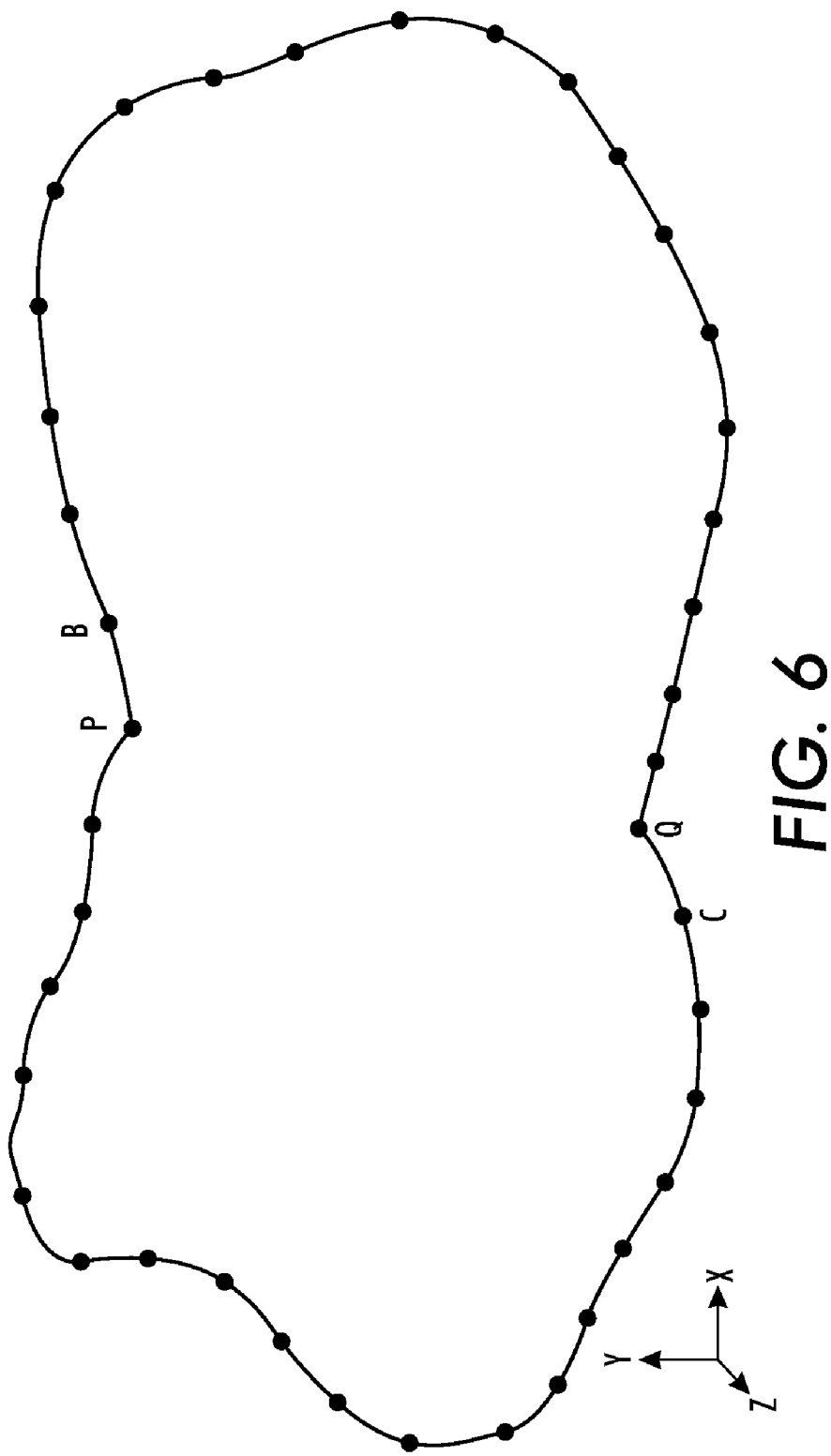
FIG. 6 illustrates a combined feature including portions of the first and second features of FIG. 3.

FIG. 3 illustrates a first feature (Feature 1) overlapping a second feature (Feature 2) according to an exemplary embodiment of the present disclosure. In the embodiment shown in FIG. 3, Feature 1 crosses Feature 2 at two crossing points (points P and Q), and the boundaries of Features 1 and 2 are made up of a series of sequential line segments each having distinct end points. In an exemplary method of the present disclosure, such feature boundary segment end points may be connected in a clockwise fashion as shown by the arrow in FIG. 3. While the clockwise connection of such end points will be described herein by way of example, it is understood that, in additional exemplary embodiments, such endpoints may be connected in a counterclockwise fashion. Moreover, it is understood that the process of defining a feature as, for example, a grouping of linked line segments having discrete end points is well known in the art. Accordingly, this process will not be described in great detail herein.

Coordinate Conversion

An exemplary conversion of feature boundaries expressed as groups of linked line segments with end points defined by Cartesian coordinates, into boundaries comprising line segments with end points defined by parametric coordinates, can be explained with respect to Features 1 and 2 illustrated in FIG. 3. Initially, each of the end points illustrated in FIG. 3 can be represented using Cartesian coordinates $(x_i, y_i)$ $\{_i=0, 1, 2, \ldots, N\}$, where $x_i$ and $y_i$ are in double precision. A point along the line segment can be represented according to the following expression:

$$\{(1-r)x_i + rx_{i+1}, (1-r)y_i + ry_{i+1}\}(_i=0, 1, 2 \ldots N-1; 0.0 <= r < 1.0),$$

where i is an integer index of the feature end points, and r is a double precision number. If (x, y) is a point of interest on a feature line segment between $(x_i, y_i)$ and $(x_{i+1}, y_{i+1})$, such as an end point or a crossing point, the parameter r can be expressed as the ratio between the distance from point (x, y) to point $(x_i, y_i)$ and the distance from $(x_{i+1}, y_{i+1})$ to the point $(x_i, y_i)$. As a result, r can also be calculated with the equation $r=(x-x_i)/(x_{i+1}-x_i)$ or the equation $r=(y-y_i)/(y_{i+1}-y_i)$ as long as one avoids the divide-by-zero error when the segment involved is either parallel to the X axis or parallel to the Y axis. Further, letting $t=i+r$, a simple one-dimensional parametric coordinate P(t), of double precision, can be calculated to describe any point of the feature wherein:

$$P(t) = \{x_t, y_t\} (0.0 <= t < N).$$

By converting to parametric coordinates, the system can identify any point along a feature boundary uniquely using only a single parameter (t). Thus, sorting, searching, and linking all points along the feature boundary can also be accomplished with a single parameter.

Conversely, the two parameter Cartesian position $\{x_t, y_t\}$ of coordinate t can be computed by first converting t into i and r according to the following equations:

$$x_t = (1-r)x_i + rx_{i+1} (i+0, 1, \ldots N-1; 0.0 <= r < 1.0); \text{ and}$$

$$y_t = (1-r)y_i + ry_{i+1} (i+0, 1, \ldots N-1; 0.0 <= r < 1.0).$$

Thus, it is possible to convert parametric coordinates into real world unit-based Cartesian coordinates and vice versa. It is understood that the methods described herein may be utilized with double precision or better. Double precision is a computer numbering format for representing floating-point values and, as such formats are commonly known in the art, this format will not be described in great detail herein.

Point Registration

Exemplary crossing point calculation methods will be described in greater detail below with respect to FIGS. 9 and 9*a*. Once parametric coordinates for the crossing points of two intersecting feature segments have been defined, the coordinates of the crossing points can be registered. As used herein, the term "register" means to record, save, and/or otherwise store in a recordable medium such as, for example, a digital computer memory. As shown in the Tables 1 and 2 of FIGS. 4 and 5, respectively, by registering the crossing points, the system may record information regarding the points such as, for example, parametric coordinates, Cartesian coordinates, and the corresponding feature identifier. In Tables 1 and 2, each row shows all of the registered information pertaining to a unique crossing point.

Point Sorting

For example, Column 1 of Table 1 lists the parametric coordinates of each crossing point disposed on an exemplary Feature #1, and Column 2 lists the order indices associated with each crossing point of Column 1. The indices in Column 2 are assigned based on the order in which the corresponding crossing point appears ($1^{st}$, $2^{nd}$, $3^{rd}$, etc.) along the boundary of exemplary Feature #1 in, for example, the clockwise direction. Similarly, Column 3 of Table 1 lists the parametric coordinates of each crossing point disposed on an exemplary Feature #2, and Column 4 lists the order indices associated with each crossing point of Column 3 based on their order along the boundary of Feature #2. Thus, Columns 2 and 4 of Table 1 contain sorted indices of the parametric coordinates listed in Columns 1 and 3, respectively.

Columns 1-4 of Table 2 correspond to Columns 1-4 of Table 1. Table 2, however, illustrates a more complex feature combination in which exemplary Feature #'s 1 and 2 combine to form more than a single combined feature. In such situations, the software may identify the combined feature to which each crossing point belongs using unique feature identifiers (1, 1, 2, etc.). Such feature identifiers are listed for each crossing point in Column 5 of Table 2.

Utilizing parametric coordinates enables the software to easily, accurately, and uniquely sort each point of interest along two or more overlapping features in an orderly fashion. In particular, parametric coordinates can be used to precisely describe not only the location of any point on a feature boundary, but also the order of points on the boundary, with just a single parameter. In other words, the distance to any point along the combined feature boundary, as measured from a starting point on the boundary, is a monotonically increasing function of its parametric coordinate. Thus, sorting all the points on a combined feature boundary according to their parametric coordinates will generate a sequential list of feature points on the boundary without the redundancy problems hampering methods using Cartesian coordinates.

For example, sorting two Cartesian coordinate points P1 (X=3, Y=7) and P2 (X=5, Y=2) on a feature boundary may result in two possible different sorted results: P1P2 (sorted according to rising X coordinate) or P2P1 (sorted according to rising Y coordinate). If points P1 and P2 were represented using parametric coordinates, on the other hand, each t value would only yield a single distinct location with a single distinct parametric coordinate (P).

Path Determination

Figure 7:
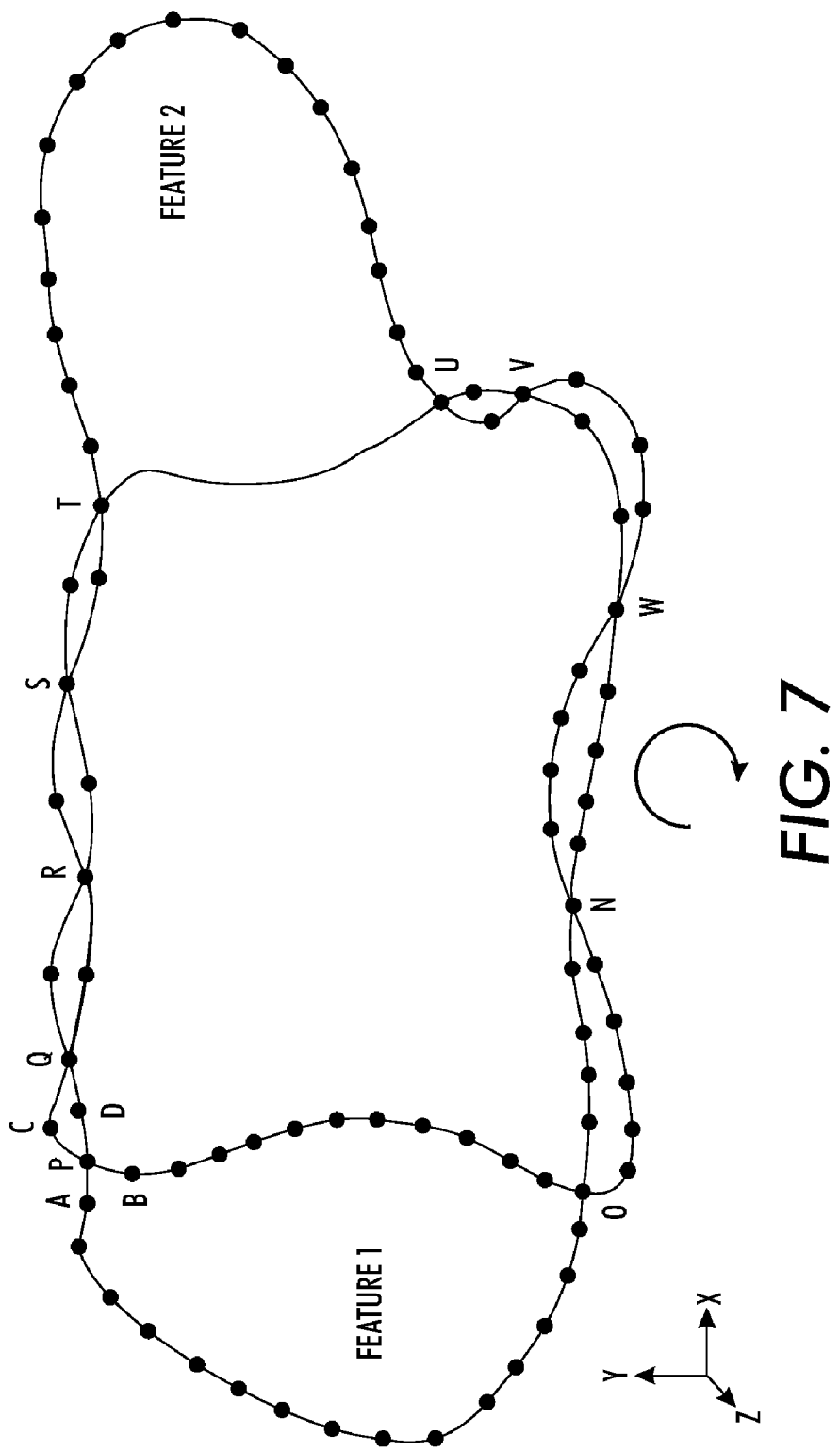
FIG. 7 illustrates a first and second feature according to an additional exemplary embodiment of the present disclosure.

The parametric coordinates described herein may also be used to determine which path the combined feature will follow (i.e., which next or intermediate point to include in the combined feature) after a crossing point has been identified and located. For example, as shown in FIG. 7, exemplary Features 1 and 2 may have a plurality of crossing points (illustrated as points N-W). A path determination can be made along boundaries of Features 1 and 2 in the outward direction, and the boundary of the combined feature shown in FIG. 8 may pass through each crossing point. In an exemplary embodiment, the software may make this determination for each intermediate point forming the two outward routes from the identified crossing point. In another exemplary embodiment, the software may also make this determination for each adjacent boundary point (intermediate point) forming the two inward routes to the identified crossing point.

Figure 8:
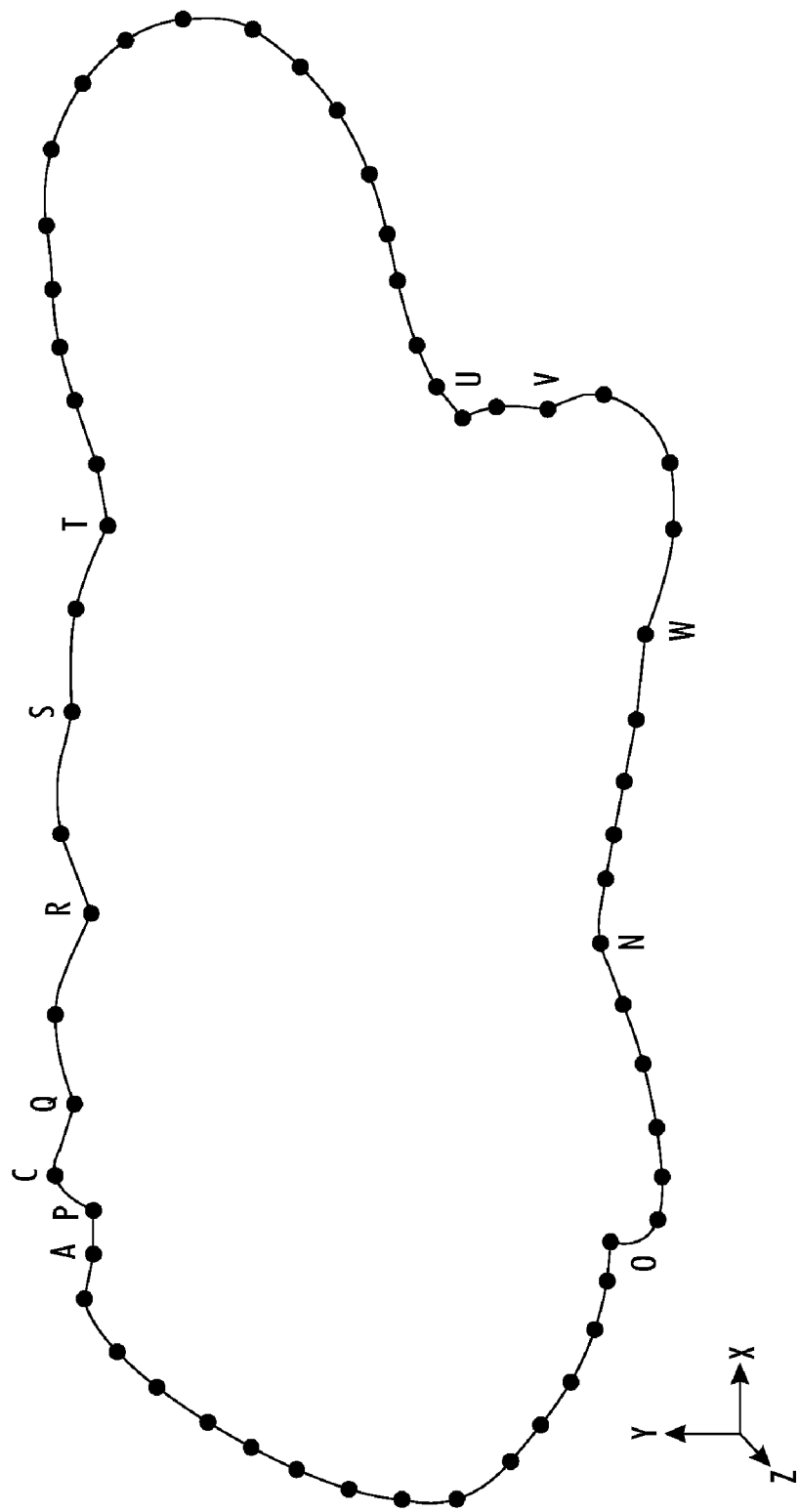
FIG. 8 illustrates a combined feature comprising portions of the first and second features of FIG. 7.

Using crossing point P of FIG. 7 as an example, the intermediate points forming the two inward routes to point P are point A of Feature 1 and point B of Feature 2. These points form the line segments AP and BP, respectively, defining the path into the crossing point P in the clockwise direction. In addition, the two intermediate points forming the two outward routes from point P are point C of Feature 2 and point D of Feature 1. These points form the line segments PC and PD, respectively, defining the path out of the crossing point P in the clockwise direction. Thus, the software may determine the boundary of the combined feature passing through crossing point P from four possible routes: APC, APD, BPC, and BPD. In an exemplary embodiment, for a feature boundary traversed in a clockwise direction, the right hand rule of vector geometry (also known as the cross product rule) can be used to make this determination. In particular, in analyzing two outward routes (or vectors pointing away from the crossing point) according to the right hand rule, if the mathematical sign of the cross product is negative, i.e., PC×PD<0, (forming a vector pointing into the page) then the segment on the left of the cross product (segment PC) may be chosen for inclusion in the resulting combined feature. Alternatively, if mathematical sign of the cross product is positive, i.e., PC×PD>0, the segment PD may be chosen for inclusion in the resulting combined feature. The combined feature including route APC is shown in FIG. 8 consisting of points linked in a clockwise direction. As discussed above, the boundary points of two intersecting features may be combined in a clockwise or counterclockwise manner. In addition, a left hand rule of vector geometry (analogous to the right hand rule discussed above) may be used according to the methods and processes described herein to yield the same result depending on whether the intersecting features are combined in a clockwise or counterclockwise direction.

Hole Features

Figure 13:
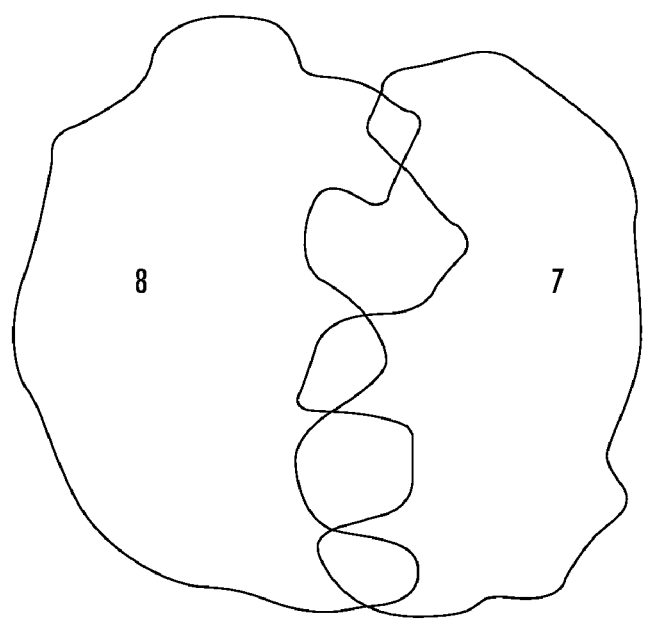
FIG. 13 illustrates two overlapping features according to an additional exemplary embodiment of the present disclosure.
Figure 14:
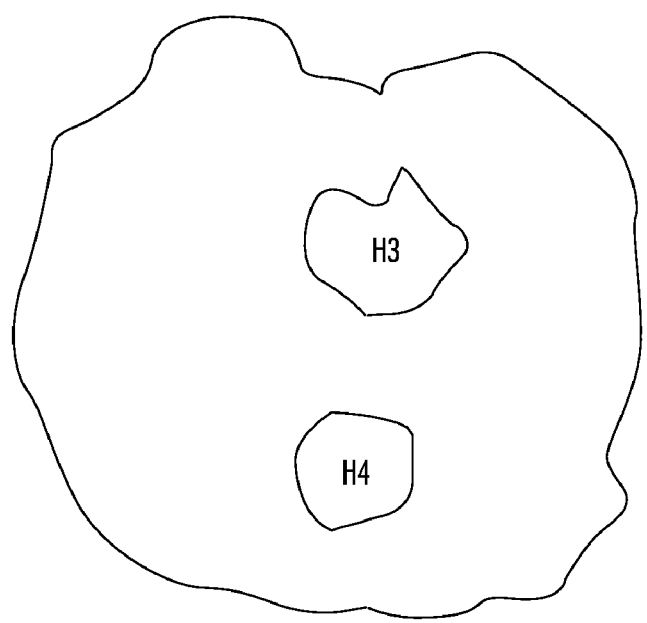
FIG. 14 illustrates a combined feature formed from the overlapping features of FIG. 13.

It is also understood that, as shown in FIGS. 10-12, when two overlapping images of a simple feature are combined, the resulting combined feature may define one or more hole features. Holes may define, for example, a defect in the imaged item. Alternatively, holes may define toleranced and/or otherwise meaningful portions of the item being analyzed. The points on the peripheries of these holes are linked in a direction opposite of that of the parent simple features. In an exemplary embodiment, the methods discussed above may also be utilized to define the perimeter, boundary, and/or configuration of such holes. These holes can be either: 1) holes that are wholly seen in at least one field of view; or 2) holes disposed along corresponding edges of two adjacent fields of view and that must be rectified to form a combined feature. Hole H2 of FIG. 11 illustrates this first scenario and Holes H3 and H4 of FIG. 14 illustrate this second scenario. Holes H3, H4 are formed by the combination of Features 7 and 8 shown in FIG. 13. The location and configuration of holes in the combined feature can be determined using the same method discussed above with respect to the adjacent points of inward and outward routes. In an exemplary embodiment, holes can be identified by the fact that the mathematical sign of their calculated area is positive and that all points on their peripheries are linked in the direction opposite that of a simple feature.

After two intersecting features have been merged to form a combined feature boundary, a portion of the combined feature may be displayed by one or more display devices of the present disclosure. Although not explicitly illustrated in the figures described above, it is understood that such a display device may include, for example, a cathode ray tube, LCD display, digital flat screen monitor, or other known image display apparatus known in the art.

INDUSTRIAL APPLICABILITY

Figure 9:
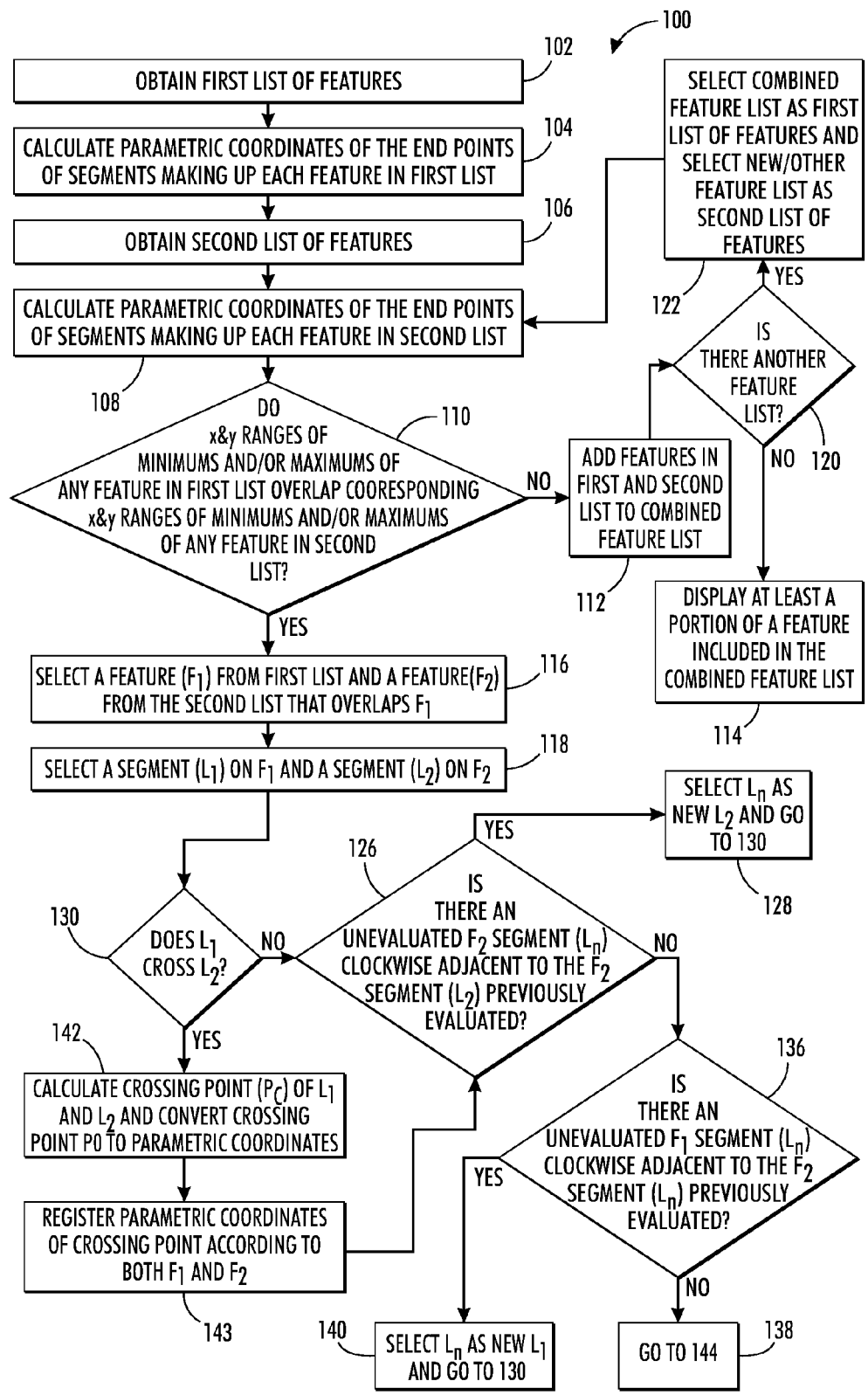
FIG. 9 illustrates a flow chart corresponding to an exemplary method of the present disclosure.
Figure 9A:
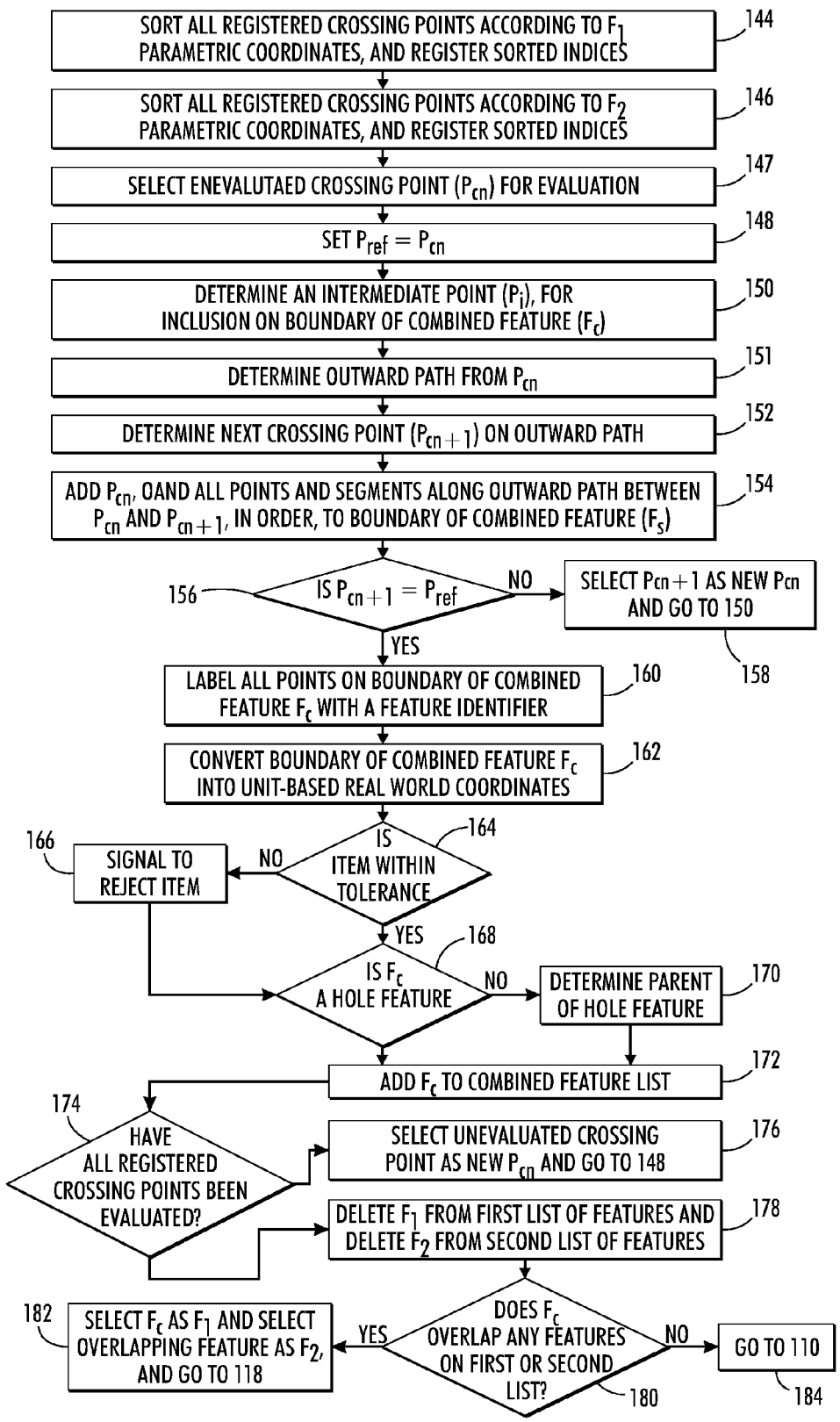
FIG. 9a is a continuation of the flow chart shown in FIG. 9.

An exemplary method of the present disclosure is illustrated in the flow chart 100 depicted in FIGS. 9 and 9a. Unless otherwise specified, the exemplary flow chart 100 illustrated in FIGS. 9 and 9a will be explained with reference to Features 1 and 2 illustrated in FIG. 3 for ease of discussion. As discussed above, the methods described herein may be utilized in a variety of inspection procedures and, in particular, inspection procedures in which one or more images of a portion of a manufactured part or item are required to assist in determining whether the manufactured item is within acceptable tolerance levels. It is understood that tolerance levels include both dimensional tolerances as well as defect detection tolerances such as the number and size of defects. This technique can also be used to reverse engineer or actually create a CAD file of a part from feature images. Such images may be taken at, for example, a casting, machining, fabrication, assembly, inspection, and/or any manufacturing facility known in the art. The methods and structures described herein may also be used in non-manufacturing applications, such those requiring high-speed and/or automated recognition of structures, handwriting, type-written text, and/or other images.

The exemplary methods described herein may also be used to form a single combined feature list from two or more lists of features. Such lists of features may be obtained from a variety of sources. Although we have described feature lists obtained by repeatedly imaging a portion of a machined part, such lists may also be obtained from a single image that is processed in two or more different light settings, or from CAD files, or from other non-image sources. In each of the exemplary embodiments described herein, such feature lists may be evaluated in an iterative, non-iterative, real-time, and/or otherwise ongoing manner as additional feature lists are obtained. Thus, each additional feature list may be iteratively or non-iteratively merged with a combined feature list to form an updated combined feature list. As a part of forming such combined feature lists, two or more overlapping feature images may be combined using the processes described herein.

In an exemplary method of forming a combined feature list, an imaging device, such as a high-speed digital camera, may be controlled to obtain a plurality of images of a portion of a machined part. Upon analyzing the plurality of images obtained, the control software may define, calculate, and/or otherwise obtain a first list of features (Step 102). The software may then define or calculate the boundaries of each feature in the first list, and any holes formed thereby, in terms of discrete line segments. The software may also calculate the parametric coordinates of the end points of each line segment making up the features in the first list, and the associated holes defined by these features. (Step 104). It is understood that although the following discussion of FIGS. 9 and 9a will generally pertain to the use of parametric coordinates, in additional exemplary embodiments, any other system of coordinates using a single parameter to uniquely determine a location on a curve in two-dimensional or three-dimensional space may be used instead.

As discussed above, the images described herein may be obtained from multiple fields of view such as, for example, multiple camera views or angles, and such fields of view may overlap. Moreover, the lists of features obtained in the exemplary methods of the present disclosure may be formed using, for example, feature location methods known in the imaging arts. Such exemplary feature locators may be primarily software-based and may be performed in each field of view. These feature locators frequently have sub-pixel resolution which further complements the real world unit-based coordinate methods presented here. In still another exemplary embodiment, the lists of features may be imported from CAD files or other known sources.

Once the first list of features is obtained in Step 102, the software may control the imaging device to obtain a second list of features (Step 106) and the software may define or calculate the boundaries of each feature in the second list, and any holes formed thereby, in terms of discrete line segments. Thus, as described above with respect to Step 102, the software may divide the boundaries of each feature in the first and second list into discrete line segments. The software may also calculate the parametric coordinates of the line segment end points making up each of the features in the second list and any associated holes (Step 108). At Steps 104 and 108, the system may also sort the parametric coordinates according to their location along the respective features as encountered in either a clockwise or counterclockwise direction. Such sorting of these parametric coordinates may be useful in, for example, determining intermediate points at Step 150, adding all portions along an outward path of the combined feature boundary, at Step 154, and/or determining the direction of the combined feature path at each crossing point. In an exemplary embodiment, the sequence of crossing point evaluation may be determined based on the sorted parametric coordinates of each crossing point.

It is understood that more than two lists of features may be obtained in additional exemplary embodiments of the present disclosure, and each of these additional feature lists may be evaluated in forming and/or otherwise updating a combined feature list. In an exemplary embodiment, once first and second lists of features are obtained, the software may begin to merge and/or otherwise combine the two lists of features. In this process, the software may examine each feature in the first list separately to determine whether or not one or more features from the second list overlaps therewith. Once the analysis has been completed for the first feature of the first list, the same analysis may then be repeated for each of the remaining features of the first list until each feature of the first list has been analyzed with respect to each feature of the second list. As a result of this analysis, the software may form the combined feature list including each feature on the imaged part. The combined feature list may then be revised and/or otherwise updated as additional feature lists are obtained and processed.

In general, if the feature being examined from the first list obtained in Step 102 does not overlap any features from the second feature list obtained in Step 106, the examined feature from the first list may be copied to the combined feature list. If, however, the feature from the first list does overlap one or more features from the second list, then the two overlapping features will be combined and the combined feature will be added to the combined feature list. The process will be repeated until, for example, each feature in the two or more feature lists has been analyzed.

In determining whether boundaries of two features overlap, the software may determine whether the x and y ranges of any feature in the first list of features obtained in Step 102 overlaps corresponding minimum and/or maximum x and y ranges of any feature in the second list of features obtained in Step 106 (Step 110). The determination made at Step 110 may be utilized as a test to see if the two features being analyzed are likely to cross each other, and this determination may be made using the Cartesian x and y minimums and/or maximums. As will be discussed below, the ultimate crossing determination may be made at Step 130. The determination made at Step 110 is not, however, redundant with Step 130 since Step 110 may serve to filter out non-overlapping features for direct inclusion on the combined feature list. If none of the x and y ranges of any of the features in the first list overlaps corresponding x and y ranges of features in the second list, all features from the feature lists obtained in Steps 102 and 106 may be used to form a cumulative combined feature list (Step 112). As shown in FIG. 9, the system may also determine whether any other feature lists exist (Step 120). At least a portion of a feature included in the combined feature list may also be displayed by one or more of the display devices discussed above (Step 114).

If, however, any maximum and/or minimum x and y ranges of any feature in the first list of features obtained in Step 102 overlaps corresponding maximum and/or minimum x and y ranges of any feature in the second list of features obtained in Step 106, a feature ($F_1$) from the first list of features may be selected to begin an exemplary feature combination process. In addition, a feature ($F_2$) from the second list of features obtained in Step 106 that overlaps the feature ($F_1$) from the first list of features may also be selected for analysis (Step 116). It is understood that, in an exemplary embodiment, the selection of the features $F_1$, $F_2$ may occur automatically or may be performed by the exemplary feature combination software utilized in embodiments of the present disclosure. Alternatively, an operator performing the feature combination process may manually select the overlapping features $F_1$, $F_2$ for examination.

After the first and second features $F_1$, $F_2$ have been selected, a line segment ($L_1$) on the feature $F_1$, and a line segment ($L_2$) on the feature $F_2$ can also be selected (Step 118), and the software may determine whether or not the features $F_1$, $F_2$ cross each other. Although not illustrated in FIG. 9, as a part of this process the software may determine whether the selected line segment $L_1$ is parallel to and/or collinear with the selected line segment $L_2$. If the line segments $L_1$, $L_2$ are parallel and/or collinear, the software may register the end points of $L_1$ that are on $L_2$. It is understood that the crossing points, end points, and/or other portions of the features discussed above may be registered in a memory device associated with, for example, a computer or other known controller associated with the display device, the imaging device, and/or the software of the present disclosure.

If the software determines that the selected segment $L_1$ is not parallel to or collinear with the selected segment $L_2$, the software may then determine whether the segment $L_1$ of feature $F_1$ crosses the segment $L_2$ of the feature $F_2$ (Step 130). If the segment $L_1$ does not cross the segment $L_2$, the software may determine if there is an unevaluated feature $F_2$ line segment ($L_N$), in a clockwise direction from the line segment $L_2$, adjacent to the feature $F_2$ segment $L_2$ previously evaluated (Step 126). It is understood that this analysis may also be done in a counterclockwise direction. If such an adjacent line segment $L_N$ does exist in a clockwise direction from the segment $L_2$ previously evaluated, the software may select the adjacent segment $L_N$ as a new line segment $L_2$ (Step 128), and the software may return to Step 130 wherein the new segment $L_2$ will be evaluated with respect to the selected segment $L_1$ of the feature $F_1$.

On the other hand, if there is no additional unevaluated segment $L_N$ from the feature $F_2$ disposed clockwise adjacent to the segment $L_2$ previously evaluated, the software may determine if there is an unevaluated segment $L_N$ on the feature $F_1$ disposed clockwise adjacent to the line segment $L_1$ of the feature $F_1$ previously evaluated (Step 136). If such an unevaluated line segment $L_N$ does not exist on the feature $F_1$, the software may go to Step 144. If, however, such a segment $L_N$ does exist on the feature $F_1$, the software may select the unevaluated line segment $L_N$ on the feature $F_1$ as a new segment $L_1$ (Step 140), and the software may then return to Step 130.

With continued reference to Step 130, if the segment $L_1$ of feature $F_1$ does cross the segment $L_2$ of feature $F_2$, the software may calculate the crossing point ($P_c$) of the segments $L_1$, $L_2$ and may convert the coordinates of the crossing point to parametric coordinates (Step 142). As discussed above with respect to FIG. 3, exemplary crossing points of Features 1 and 2 are shown as points P and Q.

It is understood that once the parametric coordinates of the end points of segments $L_1$, $L_2$ have been determined, the step of locating and/or otherwise calculating the parametric coordinates of the crossing point $P_c$ of the segments $L_1$, $L_2$ may be performed with relative ease. If $L_1$ and $L_2$ are not parallel, the crossing point of these two segments can be calculated by first representing each segment in standard geometric line equations ($A_1 x + B_1 y + C_1 = 0$ and $A_2 x + B_2 y + C_2 = 0$). The software may calculate the coefficients A, B, and C of each line equation using the known end points for each line segment. This process will thus yield two sets of coefficients ($A_1$, $B_1$, $C_1$ and $A_2$, $B_2$, $C_2$). The software may also determine whether the two lines are parallel by solving for a determining variable D according to the following equation:

$$D = A_1 B_2 - A_2 B_1.$$

If D is equal to zero, then the two line segments $L_1$ and $L_2$ are parallel, and if D does not equal zero, the two segments may cross each other. In determining if D is equal to zero, a small positive tolerance zone $\Delta$ (for example, $\Delta = 1.0\,e\hat{}\,-12$) may be defined by the software. If D falls into the condition $-\Delta < D < \Delta$, the software may determine that D is equal to zero.

If the line segments are not parallel (D is not equal to zero), the lines on which they lie will cross, but the segments themselves may still not cross. The Cartesian coordinates of the point ($x_c$, $y_c$) at which the lines cross can be calculated using the following expressions:

$$x_c = (B_2 C_1 - B_1 C_2)/D;\ \text{and}$$

$$y_c = (A_1 C_2 - A_2 C_1)/D.$$

It then must be determined whether or not the crossing point ($x_c$, $y_c$) is disposed on both line segments $L_1$ and $L_2$. This determination may be made according to the following conditions for both line segments $L_1$ and $L_2$:

$$\mathrm{Min}(x_1, x_2) \leq x_c \leq \mathrm{Max}(x_1, x_2);\ \text{and}$$

$$\mathrm{Min}(y_1, y_2) \leq y_c \leq \mathrm{Max}(y_1, y_2)$$

In the above equations, ($x_1$, $x_2$) and ($y_1$, $y_2$) are the coordinates of the two end points for either line segment $L_1$ or $L_2$. If the point ($x_c$, $y_c$) satisfies the above condition, the software will conclude that the segments $L_1$ and $L_2$ cross each other at the crossing point ($x_c$, $y_c$). The software may then convert the crossing point ($x_c$, $y_c$) into parametric coordinates, and the parametric coordinates of the crossing point ($P_c$) may be registered as shown in Table 1 (Step 143). In an exemplary embodiment, the parametric coordinates of the crossing point corresponding to both $F_1$ and $F_2$ will be registered in Step 143. If, however, one of the above conditions is not satisfied, the software wound have concluded at Step 130 that the segments $L_1$ and $L_2$ do not cross each other.

Once the crossing point $P_c$ has been registered, the software may go to Step 126 to analyze any additional unevaluated segments ($L_n$). As shown in FIG. 9a, once all crossing points $P_c$ between the Features $F_1$ and $F_2$ have been calculated, the software may sort the crossing points in any desirable order. For example, as shown in Step 144, all of the registered crossing points $P_c$ can be sorted according to the order in which the crossing points are encountered when traveling along the Feature $F_1$ in a clockwise direction. In this process, the software may assign each crossing point an order index corresponding to the order in which the points are encountered on Feature $F_1$, and may register each of these indices. Likewise, as shown in Step 146, the software may sort all of the crossing points calculated in Step 142 according to the order in which the points are encountered when traveling along Feature $F_2$ in a clockwise direction. The software may then assign an order index to each crossing point and may register the order indices. As discussed above, exemplary order indices are shown in Columns 2 and 4 of Table 1 (FIG. 4). As illustrated in Table 1, each of the crossing points $P_c$ may have a unique feature-specific order index when sorted.

As shown in FIG. 9a, the software may select an unevaluated crossing point $P_{cn}$ for evaluation in Step 147. For example, the unevaluated crossing point $P_{cn}$ could be chosen from among any of the crossing points registered at Step 143. In an exemplary embodiment, the software may select the first sorted crossing point. It is understood that the software may determine a sequence of crossing point evaluation based on the parametric coordinates assigned to each crossing point. In particular, the software may evaluate each crossing point sequentially based on the sorted order determined at either Step 144 or 146.

The software may then set an exemplary reference point $P_{ref}$ equal to $P_{cn}$ (Step 148), and may determine a next and/or intermediate point Pi on an outward path from the crossing point $P_{cn}$ (Step 150). In an exemplary embodiment, the intermediate point $P_i$ may be a point adjacent to the selected crossing point $P_{cn}$, and the determination of an intermediate point $P_i$ at Step 150 may dictate the direction of a combined feature $F_c$ from the crossing point $P_{cn}$ outward and in, for example, a clockwise direction. For example, with reference to FIG. 3, once the coordinate of the crossing point P has been determined, the software may pick the crossing point P as a point on the boundary of the combine feature $F_c$. Beginning at crossing point P, the software may then determine whether to include point A of Feature 1 or point B of Feature 2 as an intermediate point $P_i$ on an outward path of the combined feature $F_c$ from point P. Points A and B may be selected as the segment end points located adjacent to the crossing point P as determined by the sorting at the end points at steps 104 and 108. The software may then determine the outward path from the crossing point P at Step 151. In addition, although not shown in FIG. 9a, in an exemplary embodiment the software may determine whether to include point E of Feature 1 or point F of Feature 2 as an intermediate point $P_i$ on an inward path of the combined feature $F_c$.

To determine the intermediate point $P_i$ on an outward path from crossing point $P_c$ and at Step 150, the software may, for example, calculate at least the sign of the cross product of the two vectors $\vec{PA}$ and $\vec{PB}$, wherein $\vec{Z}=\vec{PA}\times\vec{PB}$. With continued reference to FIG. 3, if the hypothetical $\vec{Z}$ vector points to the −Z direction (i.e., into the plane of the paper), the path defined by segment PA will be chosen by the software as the outward path from crossing point P in the combined feature $F_c$. In addition, point A will be chosen as the intermediate point $P_i$ on the outward path from crossing point P for inclusion on the combined feature $F_c$. If, on the other hand, the $\vec{Z}$ vector points in the +Z direction (i.e., out of the plane of the paper), the path defined by segment PB will be chosen as the outward path from crossing point P, and point B will be chosen as the intermediate point $P_i$ on the outward path from crossing point P for inclusion on the combined feature $F_c$. In the exemplary embodiment illustrated in FIG. 3, the path defined by segment PB will be chosen by the software because the $\vec{Z}$ vector is pointing in the +Z direction according to the $\vec{Z}$ vector cross product equation discussed above.

In addition to the cross product rule, the software may determine the outward path and/or direction of the combined feature $F_c$ using any number of other predetermined combination rules. For example, if first and second features are analyzed in a counterclockwise direction instead of a clockwise direction, a left hand rule can be used to determine an outward path of the combined feature $F_c$ from a known crossing point. In addition, the determination made at Step 150 may include canceling and/or deleting a line segment from the first feature if the segment overlaps or partially overlaps a segment of the second feature (the two segments are parallel and on the same line), and if the segment from the first feature has an opposite direction from the segment of the second feature. In another exemplary embodiment, at Step 150 the software may also determine whether each calculated crossing point $P_c$ can be connected to another crossing point disposed on the combined feature $F_c$. If any of the crossing points cannot be connected to form a continuous combined feature, these crossing points will be deleted and not used in forming the combined feature.

In an additional exemplary embodiment, if the intersecting line segments of overlapping feature boundaries are neither parallel nor collinear, the software may calculate only a single vector cross product in determining the combined feature boundary. In such an embodiment, the software may pick a first crossing point from a sorted list of crossing points and may determine an outward path from the crossing point using the sign of a vector cross product as described above. Once this first cross product is calculated and the combined feature boundary path outward from the first crossing point is determined, the software may continue along the path until the second crossing point is reached. Because the combined feature boundary path inward to the second sorted crossing point (i.e., the outward path from the first crossing point) is known, the software may choose the outward path from the second crossing point by simply picking the path defined by the other of the two overlapping features (i.e., the feature not defining the combined feature boundary path inward to the second crossing point). The software may pick this outward path in the direction of the line segment end point having the greater parametric coordinate value or in the same direction (clockwise or counterclockwise). The software may repeat this process until the first crossing point is again reached. In such an exemplary embodiment, the system need not calculate a cross product at each newly encountered crossing point once the first cross product has been calculated. This method applies if the software starts at an arbitrary point on one of the overlapping feature boundaries and the software does not know whether the point is on the combined feature boundary.

If, however, the software knows that the starting point is on the combined feature boundary, the software need not calculate any cross products. In such an exemplary embodiment, the software may instead traverse the first feature in a first direction (clockwise or counterclockwise), switch features, and continue along the second feature in the first direction. This process may be repeated until the first crossing point is again reached. As discussed above, this streamlined process may be useful if the intersecting line segments of the overlapping feature boundaries are neither parallel nor collinear.

As shown in FIG. 9a, in Step 152, the software may determine a next crossing points ($P_{n+1}$) located on the outward path determined at Step 151. To make this determination, the software may use the sorted indices of the parametric coordinates discussed above with respect to Steps 144 and 146. For example, the sorted indices of parametric coordinates illustrated in Table 1 could be used to locate and/or otherwise determine the next crossing point $P_{n+1}$ on an outward path defined by either Feature #1 or Feature #2. With the initial crossing point $P_{cn}$ and the outward path now determined, the system may add the crossing point $P_{cn}$, each of the line segments, and each of the corresponding line segment end points included along the outward path between crossing points $P_{cn}$ and next crossing points $P_{n+1}$, in order, to the boundary of the combined feature $F_c$ (Step 154).

The software may then determine whether the next crossing point $P_{n+1}$ is equal to the reference point $P_{ref}$ selected at Step 148 (Step 156). If the next crossing point $P_{n+1}$ is different than the reference $P_{ref}$, the system may select the next crossing point $P_{n+1}$ as a new unevaluated crossing point $P_{cn}$ (Step 158), and the system may proceed to Step 150 after making such determination. On the other hand, if the system determines that the next crossing point $P_{n+1}$ is the same as the reference point $P_{ref}$ set at Step 148, the system may conclude that a new combined feature $F_c$ has been created and that all points along the boundary of the combined feature $F_c$ have been accounted for. Upon making such a determination, the software may label all of the registered crossing points of the combined feature $F_c$ with a unique feature identifier (Step 160). All crossing points on the combined feature $F_c$ may be given the same identifier, as illustrated by the identifiers shown in column 5 of Table 2. Such identifiers may be, for example, alpha-numeric in nature and may be useful in distinguishing between combined features.

As part of Step 160, each group of points can also be validated to determine whether the group forms an enclosed feature (i.e., if the head cross point connects to the tail cross point for the group). If the group of points cannot be linked from head to tail (or tail to head), then the group does not constitute a valid feature. If the group of points does constitute a valid feature, a further examination of the overall linking direction of the points in the feature may reveal if the feature is a simple feature or a hole, and this examination will be described in greater detail below. As a result of the aforementioned method of combining features, the boundary of a valid combined feature is a closed path that will not cross itself or other valid features.

Once the software has determined that a valid combined feature $F_c$ has been formed, and all of the crossing points along the combined feature boundary have been appropriately labeled with a feature identifier, the system may convert at least a portion of the boundary of the combined feature $F_c$ into unit-based real world coordinates (Step 162). In an exemplary embodiment, the system may convert at least a portion of the crossing points and line segments located on the boundary of the combined feature $F_c$ into real world coordinates. As discussed above, the real world coordinates may be, for example, millimeters, inches, or any other known unit of length and with double precision or better.

The system may use the real world coordinates to determine whether the item being analyzed is within a desired tolerance range (Step 164). As discussed above, the methods disclosed herein may be used to examine items being manufactured or produced, and may assist in rejecting items that are out of tolerance and/or otherwise unacceptable. As shown in Step 166, if the item being analyzed is not within a predetermined tolerance range, the system may send a signal to an operator, a central processor, or other controller to reject the item being analyzed. Such a signal may cause the item to be taken out of the queue for further analysis or further machining. If the item is within tolerance, and even if a reject signal is sent, the system may determine whether or not the combined feature $F_c$ is a simple feature or a hole feature (Step 168). It is understood that when two features cross each other with only two crossing points $P_c$, the resulting combined feature $F_c$ may only be a simple feature. However, when two features cross each other with more than two crossing points, the resulting combined feature $F_c$ can be a simple feature, including one more hole features disposed therein. As discussed above, the hole features can be discovered by checking the mathematical sign of the area of the combined feature. This computation may be made as a part of Step 168.

In an exemplary embodiment, the area A of each combined feature can be computed by using the following mathematical equation:

$$A = \sum_i (X_i Y_{i+1} - X_{i+1} Y_i)$$

where ($X_i$, $Y_i$) are the coordinates of $i^{th}$ point on the feature, and i is the index of the points in the feature. The index also indicates the linking sequence of points on the combined feature. The mathematical sign (positive or negative) of the area A computed from the above equation yields a reliable indication as to whether the points on the feature are clockwise linked or counterclockwise linked. If the area A for a combined feature computed from the above equation is negative, then the points on the corresponding feature are linked clockwise, i.e., the combined feature is a simple feature. If the area A for a combined feature computed from the above equation is positive, then the points on the corresponding feature are linked counterclockwise, i.e., the feature is actually a hole. Hence, the software can determine whether a feature is a simple feature or a hole automatically with simple computation.

To determine if a hole feature is inside of a combined feature $F_c$, a straight ray can be drawn from any point on the hole feature to infinity. If the line crosses the combined feature $F_c$ an odd number of times, the hole feature is within the feature $F_c$. If the line crosses the combined feature $F_c$ by an even number of times, the hole feature is not within the feature $F_c$. The software can also determine if a simple feature is within a hole feature using the same method. In addition, upon determining the presence of a hole feature within a simple feature, the software may label the parent simple feature and the child hole feature using any know nomenclature. This parent/child determination and the corresponding relationship labeling may take place at Step 170.

After Step 170, or if the software determines that the combined feature $F_c$ is not a hole, the software may add the combined feature $F_c$ to the combined feature list (Step 172). Such a combined feature list was discussed above with respect to Step 112. Moreover, it is understood that the combination of two exemplary features ($F_1$ and $F_2$) may result in multiple combined features $F_c$. Thus, even though a complete and valid combined feature $F_c$ has been added to the combined feature list at Step 172, additional crossing points not disposed on the combined feature may have been calculated at Step 142 and registered at Step 143. Such additional crossing points may be located on, for example, one or more holes formed by the combined feature $F_c$. Accordingly, the system may determine whether all the crossing points registered at Step 143 have been evaluated (Step 174). If any registered crossing points have not yet been evaluated, the system may select one of the unevaluated crossing points as a new crossing point $P_{cn}$, and may return to Step 148 where the reference point $P_{ref}$ will be reset (Step 176).

If, however, all the registered crossing points have been evaluated, the software may delete the feature $F_1$ from the first list of features and may also delete the feature $F_2$ from the second list of features (Step 178). The software may then determine whether or not the combined feature $F_c$ overlaps any features on either the first list obtained in Step 102 or on the second list obtained at Step 106 (Step 180). To make this determination, the software may employ processes similar to those explained above with respect to Step 110. If the software determines that the combined feature $F_c$ does not overlap any features on either the first or the second list, the software may proceed to Step 110 (Step 184). Upon returning to Step 110, the software may continue its determination of whether any features of the first and second list of features overlap. If, on the other hand, the software determines that the combined feature $F_c$ does overlap any features on the first or second lists, the software may select the combined feature $F_c$ as a new feature $F_1$, and the software may select the overlapping feature in question as a new feature $F_2$ (Step 182). The software may then proceed to Step 118 where segments of each respective feature will be selected for a crossing determination.

Although the exemplary methods of the present disclosure have generally been discussed with respect to the Features 1 and 2 illustrated in FIG. 3 (crossing at only two points), it is understood that the same methods can be applied to two features crossing each other at multiple crossing points such as, for example, the alternative exemplary Features 1 and 2 illustrated in FIG. 7. It is also understood that the system may convert points on the perimeter of the combined feature $F_c$ from parametric coordinates to real world unit-based coordinates at any time during the process discussed above. As discussed with respect to Step 162, the system may use these real world unit-based coordinates to determine whether a dimension of the combined feature and/or the examined part is within a predetermined tolerance range. The system may reject the examined part based on this determination.

Other embodiments will be apparent to those skilled in the art from consideration of this specification. For example, additional embodiments may utilize known filtering or point reduction techniques to smooth feature images and/or otherwise reduce the number of points included in the feature images. It is intended that the specification and examples be considered as exemplary only, with the true scope of the invention being indicated by the following claims.

What is claimed is:

1. A method of forming a combined feature boundary based on boundaries of first and second overlapping features, comprising:
   dividing the boundaries of the first and second overlapping features into line segments of known shape;
   identifying crossing points formed by the line segments;
   calculating parametric coordinates of the crossing points and determining a sequence of crossing point evaluation based on the parametric coordinates;
   calculating a first cross product based on the line segments forming a first crossing point in the determined sequence;
   choosing a first path of the combined feature boundary according to the a mathematical sign of the first cross product, the first path extending from the first crossing point to the second crossing point in the determined sequence;
   calculating a second cross product based on the line segments forming a second crossing point in the sequence;
   choosing a second path of the combined feature boundary extending from the second crossing point according to a mathematical sign of the second cross product, wherein the combined feature boundary includes the first and second crossing points and portions of at least one of the first and second feature boundaries defining the first and second paths.

2. The method of claim 1, further including;
   identifying a point adjacent to the first crossing point on the first feature boundary,
   identifying a point adjacent to the first crossing point on the second feature boundary, and
   choosing one of the point on the first feature boundary and the point on the second feature boundary as an intermediate point on the combined feature boundary.

3. The method of claim 1, further including labeling the first and second crossing points with an identifier indicative of the combined feature boundary.

4. The method of claim 1, further including sorting the first and second crossing points according to an order in which the crossing points appear on one of the first and second feature boundaries in a first direction.

5. The method of claim 4, further including labeling the first and second crossing points with indices indicative of the order in which the crossing points appear on the one of the first and second feature boundaries.

6. The method of claim 1, further including calculating an area defined by the combined feature boundary and classifying the combined feature boundary as either a simple feature or a hole feature based on a mathematical sign of the calculated area.

7. The method of claim 1, further including converting endpoint coordinates of the line segments to parametric coordinates and determining which line segments to include on the combined feature boundary based on the parametric coordinates of the line segment end points.

8. The method of claim 1, further including determining whether the combined feature boundary overlaps with a third feature boundary.

9. The method of claim 1, further including determining whether the first and second feature boundaries form crossing points not included on the combined feature boundary.

10. The method of claim 1, wherein the line segments are straight line segments.

11. The method of claim 1, further including forming a combined feature list including the combined feature boundary.

12. A method of forming a combined feature boundary based on boundaries of first and second overlapping features, comprising:
   calculating parametric coordinates of a plurality of crossing points, wherein the plurality of crossing points are formed by intersections of the first and second feature boundaries;
   organizing the plurality of crossing points into a sorted order based on their respective parametric coordinates;

determining a mathematical sign of a cross product formed by the intersections at each crossing point;

defining a path of the combined feature boundary between each of the plurality of crossing points based on the mathematical sign, the combined feature boundary comprising each of the plurality of crossing points arranged according to the sorted order and a portion of at least one of the first and second feature boundaries;

calculating an area defined by the combined feature boundary; and determining a feature type associated with the combined feature boundary based on a mathematical sign of the calculated area.

13. The method of claim 12, further including displaying a portion of the combined feature boundary.

14. The method of claim 12, wherein the first and second feature boundaries comprise toleranced portions of a manufactured part.

15. The method of claim 12, further including assigning a first order index to each crossing point of the plurality of crossing points corresponding to a location of the respective crossing point on the first feature boundary.

16. The method of claim 15, further including assigning a second order index to each crossing point of the plurality of crossing points corresponding to a location of respective crossing point on the second feature boundary.

17. The method of claim 16, further including assigning an identifier to each crossing point of the plurality of crossing points distinguishing the combined feature boundary from other combined feature boundaries.

18. The method of claim 12, wherein the feature type is one of a simple feature and a hole feature.

19. The method of claim 12, further including determining whether a hole feature is within a simple feature.

20. The method of claim 12, further including converting a portion of the combined feature boundary into unit-based coordinates.

21. The method of claim 20, further including determining whether a dimension of the combined feature boundary is within a predetermined tolerance range based on the unit-based coordinates.

22. The method of claim 21, further including rejecting a manufactured part based on the determination.

23. A method of forming a combined feature list, comprising:

obtaining first and second lists of features;

identifying a plurality of crossing points formed by boundaries of features in the first list overlapping with boundaries of features in the second list;

calculating parametric coordinates of each identified crossing point;

sorting each of the crossing points according to their respective parametric coordinates and forming a plurality of combined feature boundaries using the sorted crossing points;

adding each of the combined feature boundaries to the combined feature list; and removing each feature forming the plurality of combined feature boundaries from the first and second lists.

24. The method of claim 23, further including determining whether the combined feature boundaries overlap any features on the first and second lists.

25. A method of forming a combined feature boundary based on first and second overlapping feature boundaries, comprising:

creating an ordered list of crossing points formed by the overlapping feature boundaries;

forming a first portion of the combined feature boundary extending along the first feature boundary in a first direction and terminating at a first crossing point in the ordered crossing point list;

selecting the second feature boundary; and forming a second portion of the combined feature boundary connected to the first portion, the second portion extending along the second feature boundary in the first direction and terminating at a second crossing point of the ordered list.

26. The method of claim 25, further including forming a remainder of the combined feature boundary connected to the second portion at the second crossing point, the remainder extending along the first feature boundary in the first direction and terminating at a starting point of the first portion.

27. The method of claim 25, wherein the ordered list of crossing points is created based on parametric coordinates of each crossing point.

28. The method of claim 25, further including selecting the second feature boundary based on a mathematical sign of a calculated cross product.

* * * * *

UNITED STATES PATENT AND TRADEMARK OFFICE
CERTIFICATE OF CORRECTION

| | |
|---|---|
| PATENT NO. | : 8,121,415 B2 |
| APPLICATION NO. | : 12/259845 |
| DATED | : February 21, 2012 |
| INVENTOR(S) | : Anthony Wen Ge and Robert Lea Jackson |

It is certified that error appears in the above-identified patent and that said Letters Patent is hereby corrected as shown below:

In the drawings, Sheet 3, Fig. 4, insert the heading --Table 1-- over the illustrated table; the table entry in column 2, row 5, "$i_{1N}$-1" should read --$i_{N-1}$--; the table entry in column 3, row 5, "$v_N$-1" should read --$v_{N-1}$--; and the table entry in column 4, row 5, "$J_N$-1" should read --$j_{N-1}$--.

In the drawings, Sheet 4, Fig. 5, insert the heading --Table 2-- over the illustrated table.

In the drawings, Sheet 9, Fig. 9A, the questions raised within decision boxes 156, 164 and 168 should be terminated with the addition of a --?--; the label "NO" of the direction arrow projecting from the decision box 168 to the right should be changed to --YES--; the arrow projecting downwardly from the decision box 168 should be labeled --NO--; the arrow projecting from decision box 174 to the right should be labeled --NO--; and the arrow leaving the bottom of the decision box 174 should be labeled --YES--.

In column 8 of the specification, in lines 12 and 13, the bracketed equality set "$\{_i=0, 1,2, \ldots, N\}$" should read --$\{i=0, 1,2, \ldots, N\}$--; in line 17, the parenthetical expression "$_i=0, 1, 2 \ldots N\text{-}l; 0.0<=r<1.0)$" should read --$(i=0, 1, 2 \ldots N\text{-}l; 0.0 \leq r<1.0)$--; in line 33, the bracketed expression "$\{x_p\ y_t\}$" of equation "P(t)" should read --$\{x_t, y_t\}$--; in line 43, the parenthetical expression "$(i+0, 1, \ldots N\text{-}l; 0.0<=r<1.0)$" should read --$(i=0, 1, \ldots N\text{-}1; 0.0 \leq r<1.0)$--; and, in line 46 the parenthetical expression "$(i+0, 1, \ldots N\text{-}l; 0.0<=r<1.0)$"; should read --$(i=0, 1, \ldots N\text{-}1; 0.0 \leq r<1.0)$--.

Signed and Sealed this
Twenty-first Day of August, 2012

David J. Kappos
*Director of the United States Patent and Trademark Office*